(12) United States Patent
Song et al.

(10) Patent No.: US 11,716,715 B2
(45) Date of Patent: *Aug. 1, 2023

(54) METHOD OF PERFORMING BWP OPERATION IN WIRELESS COMMUNICATION SYSTEM AND AN APPARATUS THEREFOR

(71) Applicant: LG Electronics Inc., Seoul (KR)

(72) Inventors: Huayue Song, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,811

(22) Filed: Jun. 10, 2022

(65) Prior Publication Data

US 2022/0303994 A1 Sep. 22, 2022

Related U.S. Application Data

(63) Continuation of application No. 16/316,891, filed as application No. PCT/KR2018/008356 on Jul. 24, 2018, now Pat. No. 11,381,373.

(Continued)

(30) Foreign Application Priority Data

Jul. 24, 2018 (KR) .......................... 10-2018-0085987

(51) Int. Cl.
*H04W 72/04* (2023.01)
*H04L 5/00* (2006.01)
(Continued)

(52) U.S. Cl.
CPC ....... *H04W 72/0453* (2013.01); *H04L 5/0098* (2013.01); *H04L 5/14* (2013.01); *H04W 72/23* (2023.01)

(58) Field of Classification Search
CPC ... H04W 28/04; H04W 72/04; H04W 72/042; H04W 88/08; H04W 72/0453; H04L 5/0007; H04L 5/0098; H04L 5/14
(Continued)

(56) References Cited

U.S. PATENT DOCUMENTS

2019/0044689 A1 2/2019 Yiu et al.
2019/0149213 A1* 5/2019 Zhou ..................... H04L 5/0007
370/329

(Continued)

FOREIGN PATENT DOCUMENTS

CN 104488206 4/2015
WO 2019022473 1/2019

OTHER PUBLICATIONS

3GPP TSG RAN WG1 NR Ad-Hoc#2, Qingdao, P.R. China Jun. 27-30, 2017, R1-1710761, Agenda item: 5.1.7, Source: Samsung, Title: Wider Bandwidth Operations. (Year: 2017).*

(Continued)

*Primary Examiner* — Peter G Solinsky
*Assistant Examiner* — Sanjay K Dewan
(74) *Attorney, Agent, or Firm* — Fish & Richardson P.C.

(57) ABSTRACT

This specification provides a method of performing a bandwidth part (BWP) operation in a wireless communication system. Specifically, The method performed by a terminal includes receiving a first message including information related to at least one initial BWP configuration from a network, receiving a second message including configuration information for an additional BWP from the network, receiving downlink control information (DCI) related to BWP switching for at least one configured BWP from the network, and transmitting and receiving signals to and from the network in an activated BWP based on the received DCI.

15 Claims, 9 Drawing Sheets

Related U.S. Application Data

(60) Provisional application No. 62/538,068, filed on Jul. 28, 2017.

(51) Int. Cl.
  *H04L 5/14* (2006.01)
  *H04W 72/0453* (2023.01)
  *H04W 72/23* (2023.01)

(58) Field of Classification Search
  USPC .......................................................... 370/329
  See application file for complete search history.

(56) References Cited

U.S. PATENT DOCUMENTS

| | | | |
|---|---|---|---|
| 2019/0149286 A1 | 5/2019 | Zhang et al. | |
| 2019/0150172 A1 | 5/2019 | Ang et al. | |
| 2019/0150200 A1 | 5/2019 | Chen et al. | |
| 2019/0208507 A1 | 7/2019 | Xiong et al. | |
| 2019/0215870 A1 | 7/2019 | Babaei et al. | |
| 2019/0222290 A1 | 7/2019 | Ly et al. | |
| 2019/0313437 A1* | 10/2019 | Jung | H04W 72/0453 |
| 2019/0357292 A1* | 11/2019 | Cirik | H04W 24/08 |
| 2020/0044723 A1 | 2/2020 | Cirik et al. | |
| 2020/0053797 A1 | 2/2020 | Basu Mallick et al. | |
| 2020/0106573 A1 | 4/2020 | Cirik et al. | |
| 2020/0244410 A1* | 7/2020 | Kim | H04W 72/044 |
| 2020/0244429 A1* | 7/2020 | Bao | H04W 36/08 |
| 2020/0259627 A1 | 8/2020 | Loehr et al. | |
| 2020/0314885 A1 | 10/2020 | Cirik et al. | |
| 2021/0167930 A1 | 6/2021 | Jeon et al. | |
| 2021/0203468 A1 | 7/2021 | Yi et al. | |
| 2021/0409170 A1 | 12/2021 | Cirik et al. | |

OTHER PUBLICATIONS

3GPP TSG-RAN WG1 Meeting NR#2, Qingdao, China, Jun. 27-30, 2017, R1-1710883, Source: Nokia, Alcatel-Lucent Shanghai Bell, Title: On wider band aspects of NR, Agenda item: 5.1.7. (Year: 2017).*

3GPP TSG RAN WG1 NR Ad-Hoc#2, Qingdao, P.R. China, Jun. 27-30, 2017, R1-1710583, Agenda item: 5.1.7, Source: Intel Corporation, Title: Open issues for wider bandwidth operations. (Year: 2017).*

3GPP TSG RAN WG1 Meeting #91, Reno, USA, Nov. 27-Dec. 1, 2017, R1-1719828, Agenda item: 7.3.6, Source: Huawei, HiSilicon, Title: Bandwidth part activation and adaptation. (Year: 2017).*

3rd Generation Partnership Project, MediaTek, Inc., "Further Details on Wider Bandwidth Operations in NR," R1-1710796, 3GPP TSG RAN WG1, Qingdao. P.R. China, dated Jun. 27-30, 2017, 7 pages.

3rd Generation Pmtnersbip Project, MediaTek, Inc., "Efficient Wider Bandwidth Operations for NR" R1-1707828, 3GPP TSG RAN WGI, Hangzhou, China, dated May 15-19, 2017, 7 pages.

Chinese Office Action in Chinese Appln. No. 201880002811.1, dated Dec. 17, 2020, 17 pages (with English translation).

Convida Wireless, "Discussion on BWP Design," R1-1716647, 3GPP TSG RAN WG1 Meeting NR#3, Nagoya, Japan, dated Sep. 18-21, 2017, 7 pages.

Extended European Search Report in European Application No. 18826170.5, dated Mar. 17, 2020, 9 pages.

Guangdong OPPO Mobile Telecom, "Bandwidth part configuration and frequency resource allocation," 3GPP TSG RAN WG1 NR Ad-Hoc #2, R1-1710164, Qingdao, China, Jun. 27-30, 2017, 6 pages.

Huawei et al., "On bandwidth adaptation," 3GPP TSG RAN WG1 NR Ad-Hoc Meeting, R1-1711424, Qingdao, China, Jun. 27-30, 2017, 5 pages.

Huawei, HiSilicon, "Bandwidth part activation and adaptation," R1-1719828, 3GPP TSG RAN WG1 Meeting #91, Reno, USA, dated Nov. 27-Dec. 1, 2017, 8 pages.

Huawei, HiSilicon, "Overview of wider bandwidth operations," R1-1709972, 3GPP TSG RAN WG1 NR Ad Hoc Meeting, Qingdao, China, Jun. 27-30, 2017, 11 pages.

Intel Corporation, "Open issues for wider bandwidth operations," 3GPP TSG RAN WG1 NR Ad-Hoc #2, R1-1710583, Qingdao, P.R. China, Jun. 27-30, 2017, 7 pages.

InterDigital Inc., "CORESET Monitoring Under Dynamic Change of BWP," 3GPP TSG RAN WG1 NR Ad-Hoc #2, R1-1710872, Qingdao, China, Jun. 27-30, 2017, 5 pages.

Nokia et al., "On wider band aspects of NR," 3GPP TSG-RAN WG1 Meeting NR #2, R1-1710883, Qingdao, China, Jun. 27-30, 2017, 6 pages.

Samsung, "Wider Bandwidth Operations," 3GPP TSG RAN WG1 NR Ad-Hoc #2, R1-1710761, Qigdao, P.R. China, Jun. 27-30, 2017, 8 pages.

Samsung, "Corrections forBWP switching," R2-1801467, 3GPP TSG-RAN WG2 NR 2018AH#1 Meeting, Vancouver, Canada, dated Jan. 22-26, 2018, 9 pages.

Samsung, "Email discussion on RRC triggered BWP activation," R2-1808645, 3GPP TSG-RAN WG2 NR #102 Meeting, Busan, Korea, dated May 21-25, 2018, 12 pages.

Samsung, "Further considerations forBWP switching," R2-1801468, 3GPP TSG-RAN WG2 HR 2018AH#1 Meeting, Vancouver, Canada, dated Jan. 22-26, 2018, 6 pages.

* cited by examiner (a)

(b)

(c)

(d)

METHOD OF PERFORMING BWP OPERATION IN WIRELESS COMMUNICATION SYSTEM AND AN APPARATUS THEREFOR

CROSS-REFERENCE TO RELATED APPLICATIONS

This application is a continuation of U.S. application Ser. No. 16/316,891, filed on Jan. 10, 2019, which is a National Stage filing under 35 U.S.C. 371 of International Application No. PCT/KR2018/008356, filed on Jul. 24, 2018, which claims the benefit of U.S. Provisional Application No. 62/538,068 filed on Jul. 28, 2017 and KR Application No. 10-2018-0085987 filed on Jul. 24, 2018, the contents of which are all hereby incorporated by reference herein in their entirety.

TECHNICAL FIELD

The present invention relates to a wireless communication system and, more particularly, to a method of performing a bandwidth part (BWP) operation and an apparatus supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An object of this specification is to provide a method of configuring a BWP and an operation method of a UE and an eNB in a configured BW.

Furthermore, an object of this specification is to provide a method of configuring a shared control resource set (CORESET) depending on whether a shared part is present between BWPs and transmitting and receiving DCI related to BWP switching through the shared CORESET.

Furthermore, an object of this specification is to provide a processing method if the reception of DCI related to BWP switching and a message related to the reception of the corresponding DCI have missed.

Technical objects to be achieved in the present invention are not limited to the aforementioned technical objects, and other technical objects not described above may be evidently understood by a person having ordinary skill in the art to which the present invention pertains from the following description.

Technical Solution

This specification is to provide a method of performing a bandwidth part (BWP) operation in a wireless communication system.

Specifically, the method performed by a terminal includes receiving a first message including information related to at least one initial BWP configuration from a network, receiving a second message including configuration information for an additional BWP from the network, receiving downlink control information (DCI) related to BWP switching for at least one configured BWP from the network, and transmitting and receiving signals to and from the network in an activated BWP based on the received DCI.

Furthermore, in this specification, the BWP switching includes the activation of a BWP or the deactivation of a BWP.

Furthermore, in this specification, the configuration information for the additional BWP includes a BWP identifier (ID) to identify the additional BWP.

Furthermore, in this specification, when a downlink (DL) BWP is switched by the DCI, a uplink (UL) BWP switches into a corresponding BWP.

Furthermore, in this specification, the corresponding BWP is a uplink (UL) BWP corresponding to the switched BWP.

Furthermore, in this specification, the switching into the corresponding BWP for the UL BWP is applied in a time division duplex (TDD) system.

Furthermore, in this specification, the DCI related to the BWP switching is received in a shared control resource set (CORESET), and the shared CORESET is configured in a shared part between a configured first BWP and a configured second BWP.

Furthermore, in this specification, the first BWP and the second BWP have the same numerology.

Furthermore, in this specification, the method further includes transmitting an acknowledge (ACK) or a non-acknowledge (NACK) for the DCI to the network.

Furthermore, in this specification, a terminal performing a bandwidth part (BWP) operation in a wireless communication system includes a radio frequency (RF) module for transmitting and receiving radio signals and a processor functionally connected to the RF module. The processor is configured to receive a first message including information related to at least one initial BWP configuration from a network, receive a second message including configuration information about an additional BWP from the network, receive downlink control information (DCI) related to BWP switching for at least one configured BWP from the network, and transmit and receiving signals to and from the network in the activated BWP based on the received DCI.

Advantageous Effects

This specification defines a method of configuring a BWP so that signals can be transmitted and received in an activated BWP between a UE and a network.

Furthermore, this specification has an effect in that performance deterioration attributable to a system error can be minimized because a processing operation of messages related to BWP switching is clearly defined depending on whether a shared part is present between BWPs.

Effects which may be obtained in the present invention are not limited to the aforementioned effects, and other technical effects not described above may be evidently understood by a person having ordinary skill in the art to which the present invention pertains from the following description.

DESCRIPTION OF DRAWINGS

The accompanying drawings included as part of the detailed description in order to help understanding of the present invention provide embodiments of the present invention, and describe the technical characteristics of the present invention along with the detailed description.

MODE FOR INVENTION

Figure 1:
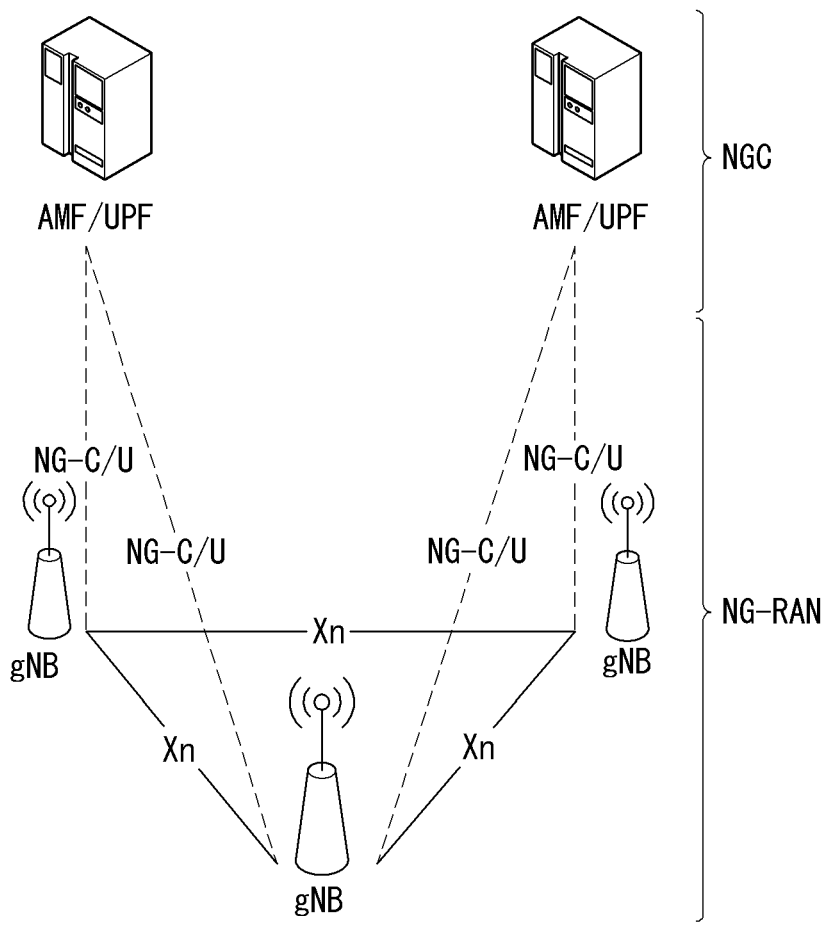
FIG. 1 is a diagram showing an example of general system architecture of NR to which a method proposed in this specification may be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$ and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
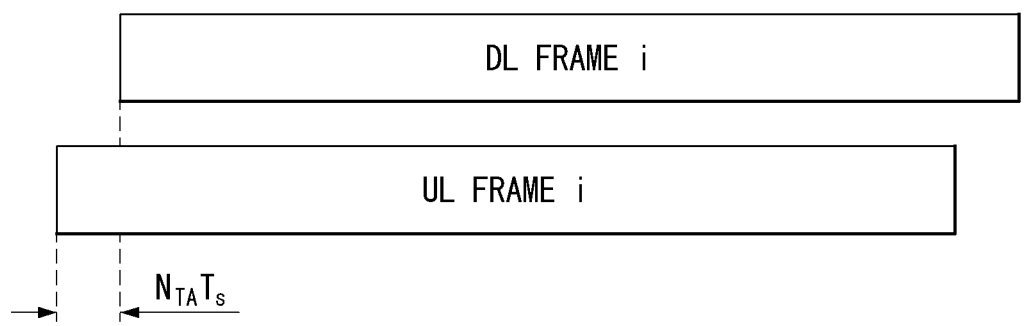
FIG. 2 shows the relation between an uplink frame and a downlink frame in a wireless communication system to which a method proposed in this specification may be applied.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology µ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology µ, and Table 3 shows the number of OFDM symbols per slot for an extended CP in the numerology µ.

TABLE 2

| | | | | Slot configuration | | | |
|---|---|---|---|---|---|---|---|
| | | 0 | | | 1 | | |
| µ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
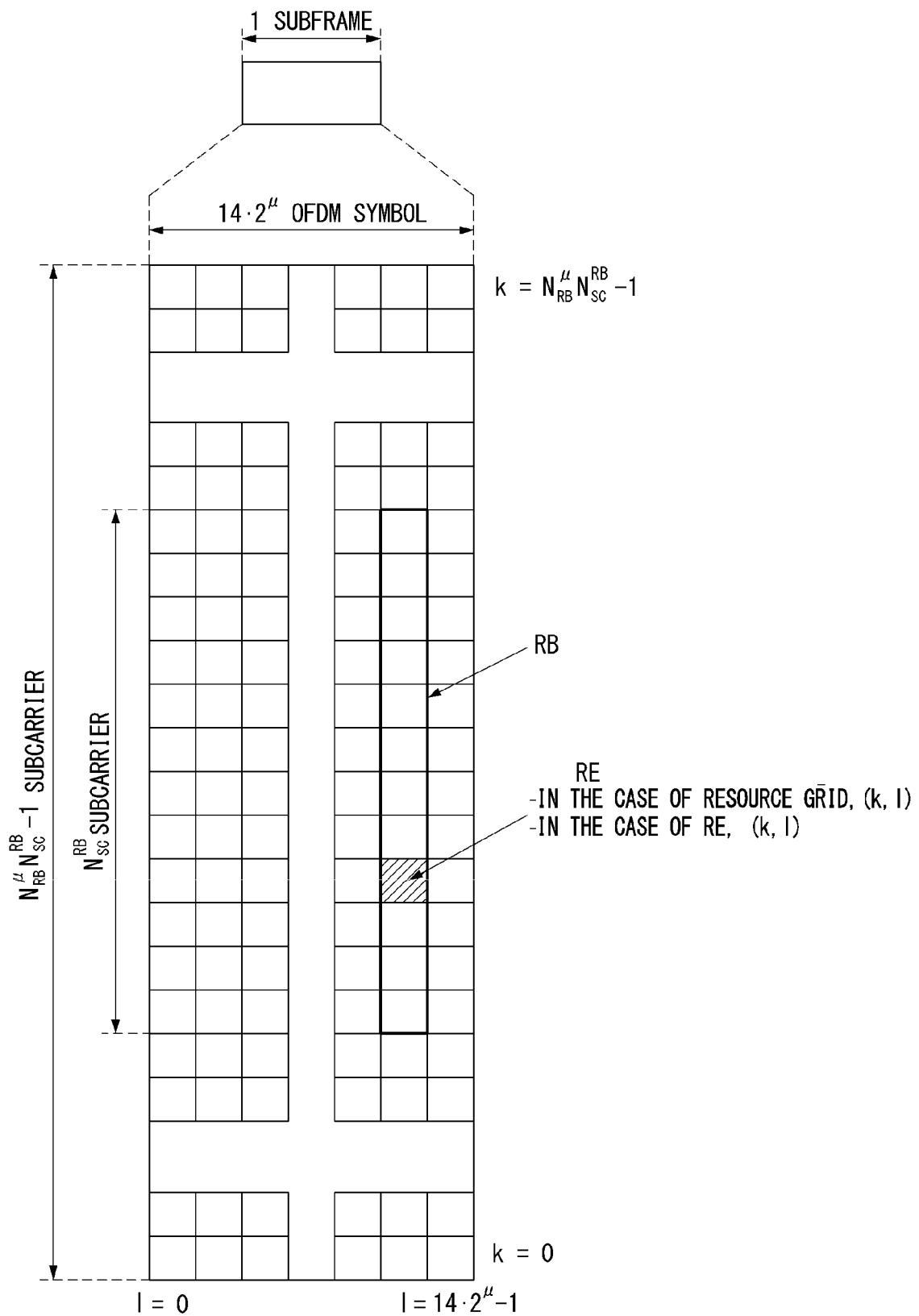
FIG. 3 shows an example of a resource grid supported in a wireless communication system to which a method proposed in this specification may be applied.

FIG. 3 illustrates an example of a resource grid supported in a wireless communication system to which a method proposed by the present disclosure may be implemented.

Referring to FIG. 3, a resource grid is composed of $N_{RB}^{\mu}N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^{\mu}N_{sc}^{RB}$ subcarriers, and $2^{\mu}N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured for the numerology μ and an antenna port p.

Each element of the resource grid for the numerology μ and the antenna port p is indicated as a resource element, and may be uniquely identified by an index pair (k,l̄). Herein, $k=0, \ldots, N_{RB}^{\mu}N_{sc}^{RB}-1$ is an index in the frequency domain, and $\bar{l}=0, \ldots, 2^{\mu} N_{symb}^{(\mu)}-1$ indicates a location of a symbol in a subframe. To indicate a resource element in a slot, the index pair (k,l) is used. Herein, $l=0, \ldots, N_{symb}^{\mu}-1$.

The resource element (k,l̄) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Subframe Structure

A time division duplexing (TDD) structure taken into consideration in the NR system is a structure in which both uplink (UL) and downlink (DL) are processed in a single subframe. This is for minimizing latency of data transmission in the TDD system, and such a structure is called a self-contained subframe structure.

Figure 4:
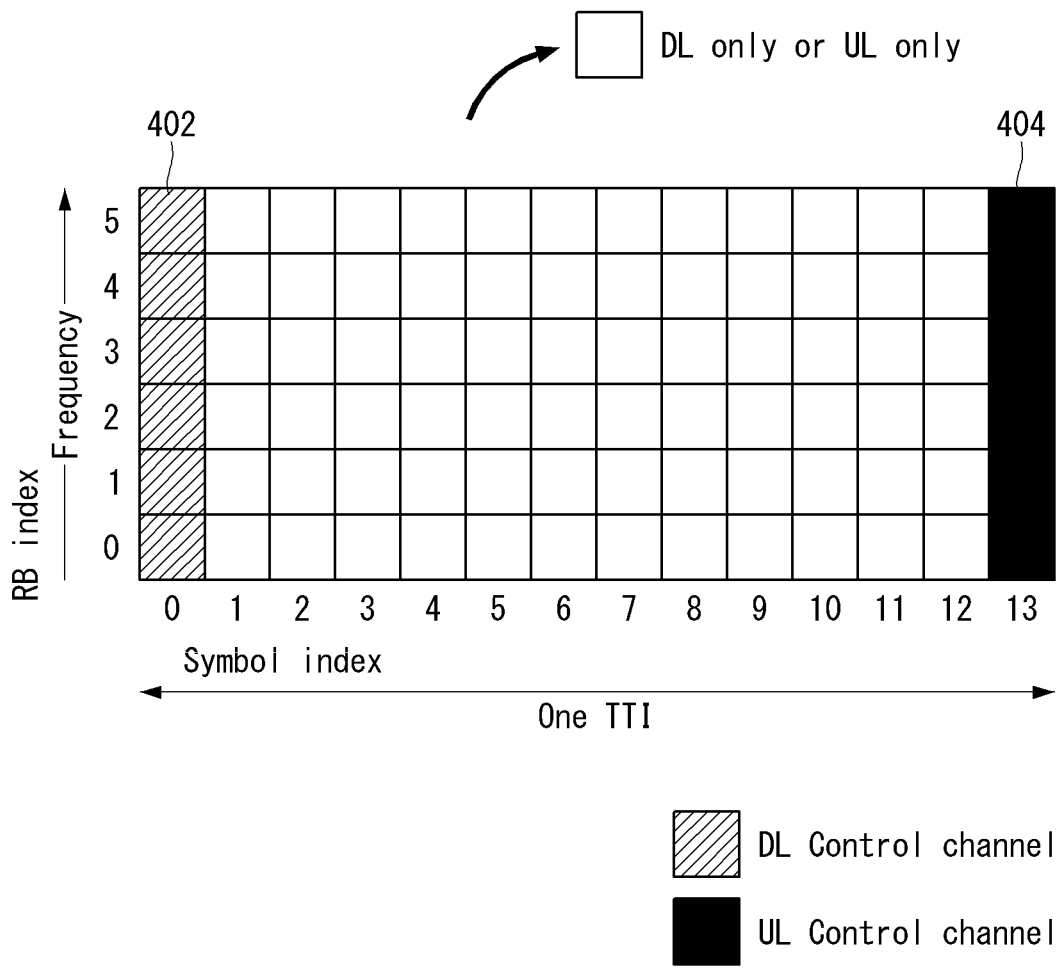
FIG. 4 shows an example of a self-contained subframe structure to which a method proposed in this specification may be applied.

FIG. 4 shows an example of a self-contained subframe structure to which a method proposed in this specification may be applied. FIG. 4 is only for convenience of description, and does not limit the scope of the present invention.

Referring to FIG. 4, in the case of legacy LTE, a case where one subframe includes 14 orthogonal frequency division multiplexing (OFDM) symbols is assumed.

In FIG. 4, a region 402 means a downlink control region, and a region 404 means an uplink control region. Furthermore, a region (i.e., a region not having a separate indication) other than the region 402 and the region 404 may be used for the transmission of downlink data or the transmission of uplink data.

That is, uplink control information and downlink control information are transmitted in one self-contained subframe. In contrast, in the case of data, uplink data or downlink data is transmitted in one self-contained subframe.

If the structure shown in FIG. 4 is used, downlink transmission and uplink transmission are sequentially performed in one self-contained subframe. The transmission of downlink data and the reception of uplink ACK/NACK may be performed.

As a result, when an error of data transmission occurs, the time taken up to the retransmission of data may be reduced. Accordingly, latency related to data delivery can be minimized.

In a self-contained subframe structure such as FIG. 4, a time gap for a process for a base station (eNodeB, eNB, gNB) and/or a terminal (user equipment (UE)) to switch from a transmission mode to a reception mode or a process for the base station and/or the terminal to switch from the reception mode to the transmission mode is necessary. In relation to the time gap, if uplink transmission is performed in a self-contained subframe after downlink transmission, some OFDM symbol(s) may be configured as a guard period (GP).

Furthermore, in the NR system, several types of self contained subframe structures may be taken into consideration in addition to the structure shown in FIG. 4.

Figure 5:
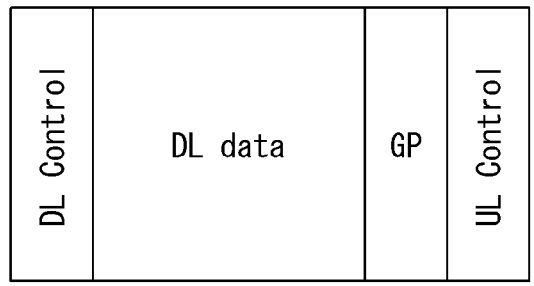
FIG. 5 shows examples of self-contained subframe structures to which a method proposed in this specification may be applied.
Figure 5:
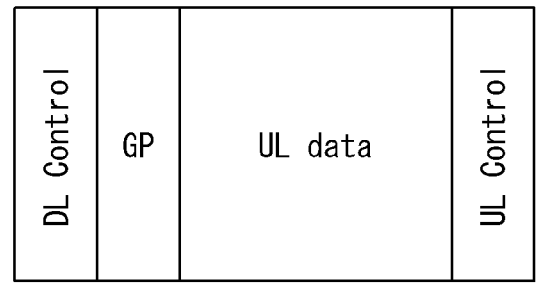
Figure 5:
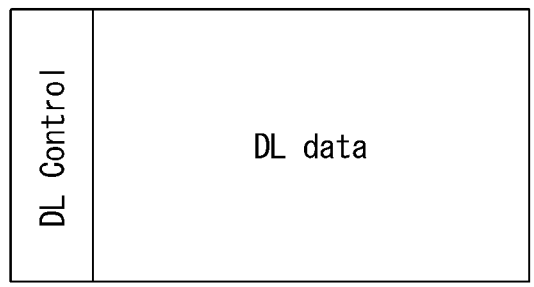
Figure 5:
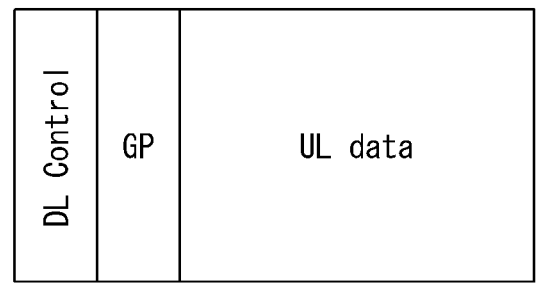

FIG. 5 shows examples of self-contained subframe structures to which a method proposed in this specification may be applied. FIG. 5 is only for convenience of description, and does not limit the scope of the present invention.

As in FIGS. 5(a) to 5(d), a self-contained subframe in the NR system may have various combinations using a downlink (DL) control region, a DL data region, a guard period (GP), an uplink (UL) control region, and/or an uplink (UL) data region as one unit.

A new radio (NR) system includes terminals (e.g., UEs) supporting various bandwidths (BWs).

One of the representative objects of the NR system is that a network (NW) flexibly schedules all UEs.

That is, the network needs to support the flexible signaling of the BW sizes (BWs that may be supported by UEs) and BW locations of UEs in order to optimize the transmission and reception environment of all the UEs.

To this end, the UE may receive one or more bandwidth parts (BWPs) configured by a network.

In this case, the BWPs may have various (or different) sizes or the same size.

Elements forming each BWP may include a bandwidth size, a frequency location, numerology and a BWP identifier (ID).

The UE may communicate with the network using one or a plurality of BWP(s) of the configured BWPs.

In this case, a BWP used for the communication may be called an activated BWP.

That is, one UE may have one or a plurality of activated BWPs.

Hereinafter, in this specification, a method of configuring a BWP in one UE, a method of activating/deactivating a BWP for communication with a network, and operations of a UE and network in the methods are described in detail.

In this specification, the activation or deactivation of a BWP may be a concept included in BWP switching.

First, a BWP and CORESET used in this specification are described in brief.

A bandwidth part (BWP) means a subset of contiguous common resource blocks.

A maximum of 4 BWPs may be configured in a UE in DL having one DL BWP that is activated in a given time. Furthermore, the UE does not expect the reception of a PDSCH, PDCCH or CSI-RS (other than a CSI-RS for RRM) out of an activated BWP.

Furthermore, a maximum of 4 BWPs may be configured in a UE in DL having one UL BWP that is activated in a given time.

Furthermore, in TDD (unpaired spectrum), a UE may assume that 2 BWPs have been paired into the same BWP index.

A control resource set (CORESET) includes N resource blocks given by a higher layer parameter in the frequency domain. In this case, N indicates the number of RBs within the CORESET.

Initial Bandwidth Part Configuration Method

First, an initial BWP configuration method is described.

After initial access to a network, a UE may have BWPs available for data transmission and reception configured by the network.

Some methods of performing the initial BWP configuration are described.

(Method 1)

Method 1 is a method of configuring a BW in which a message 4 (Msg4) is received in an RACH procedure as an initial BWP.

A BWP configured through Method 1 continues to remain until a BWP configuration is received by a UE through RRC signaling.

(Method 2)

Method 2 is a method of configuring the remaining minimum system information (RMSI) BW as the initial BWP of a UE.

A UE may detect a synchronization signal (SS) block (SSB) and may have an RMSI BW indicated by a physical broadcast channel (PBCH).

The UE may configure the RMSI BW as an initial BWP.

In this case, both an NW and the UE do not require an additional process for configuring the initial BWP.

A BWP may be additionally configured in the UE within the RMSI BW and resources may be allocated to the UE.

(Method 3)

Method 3 is a method of always configuring an initial BWP using an RRC configuration.

An initial BWP is configured in a UE through RRC signaling.

The initial BWP may include at least one initial DL BWP and at least one initial UL BWP.

If corresponding information (information about an initial BWP) is not present in the RRC signaling, the UE may assume the same BWP or RMSI BW as a system BW as an initial BWP.

One or a plurality of BWP configurations may be present in the RRC signaling.

The BWP configuration may include a BWP ID to identify a BWP.

If one configured BWP is present, a UE may consider the corresponding BWP to be an activated state.

Alternatively, if a plurality of configured BWPs is present, an NW may indicate which BWP(s) will be activated for a UE.

If one activated BWP is permitted at one instant, it may be assumed that a BWP having a specific BWP ID (e.g., BWP ID=1) from among a plurality of configured BWPs has been activated (or activated).

Additional Bandwidth Part (BWP) Configuration Method

Next, a method of configuring an additional BWP is described.

An additional BWP in addition to BWPs configured in an initial access process along with an NW may be configured in a UE.

Some methods of configuring an additional BWP are described.

(Method 1)

Method 1 is a method of providing notification of the BW of an additional BWP and related parameters through RRC signaling.

If an additional BWP is RRC configured, the following some contents may be taken into consideration.

Consideration 1: BWP indication capable of activating an old BWP of additional configurations while overriding it is performed.

In the state in which an old BWP has been activated, if the same location as that of the old BWP or the old BWP is included regardless of the numerology of an additional BWP, it may be configured (or defined) that a newly configured BWP has been activated.

Consideration 2: it may be considered that only an additional BWP is always added in a re-configuration through RRC signaling (in other than initial RRC configuration).

(Method 2)

In Method 2, an additional BWP is configured and a BWP is activated/deactivated based on UE-specific downlink control information (DCI).

As in the aforementioned RRC signaling method, a new BWP configuration is performed based on UE-specific DCI and a corresponding BWP may be activated simultaneously.

For example, if a configured new BWP ID is configured identically with a currently activated BWP ID, a new BWP may be activated at the same time when an old BWP is deactivated.

Activate/Deactivate Procedures for a Bandwidth Part

Next, an activation/deactivation procedure for a BWP is described.

Hereinafter, DCI-based BWP activation/deactivation is described as an example.

That is, the switching of a DCI-based BWP is described.

An activated BWP and a BWP activated at a next instant, from among configured BWPs, may have different procedures depending on an overlap situation between the BWPs when activation (or deactivation) is performed.

That is, three cases may be basically described as in FIGS. 6(a) to 6(c).

Figure 6:
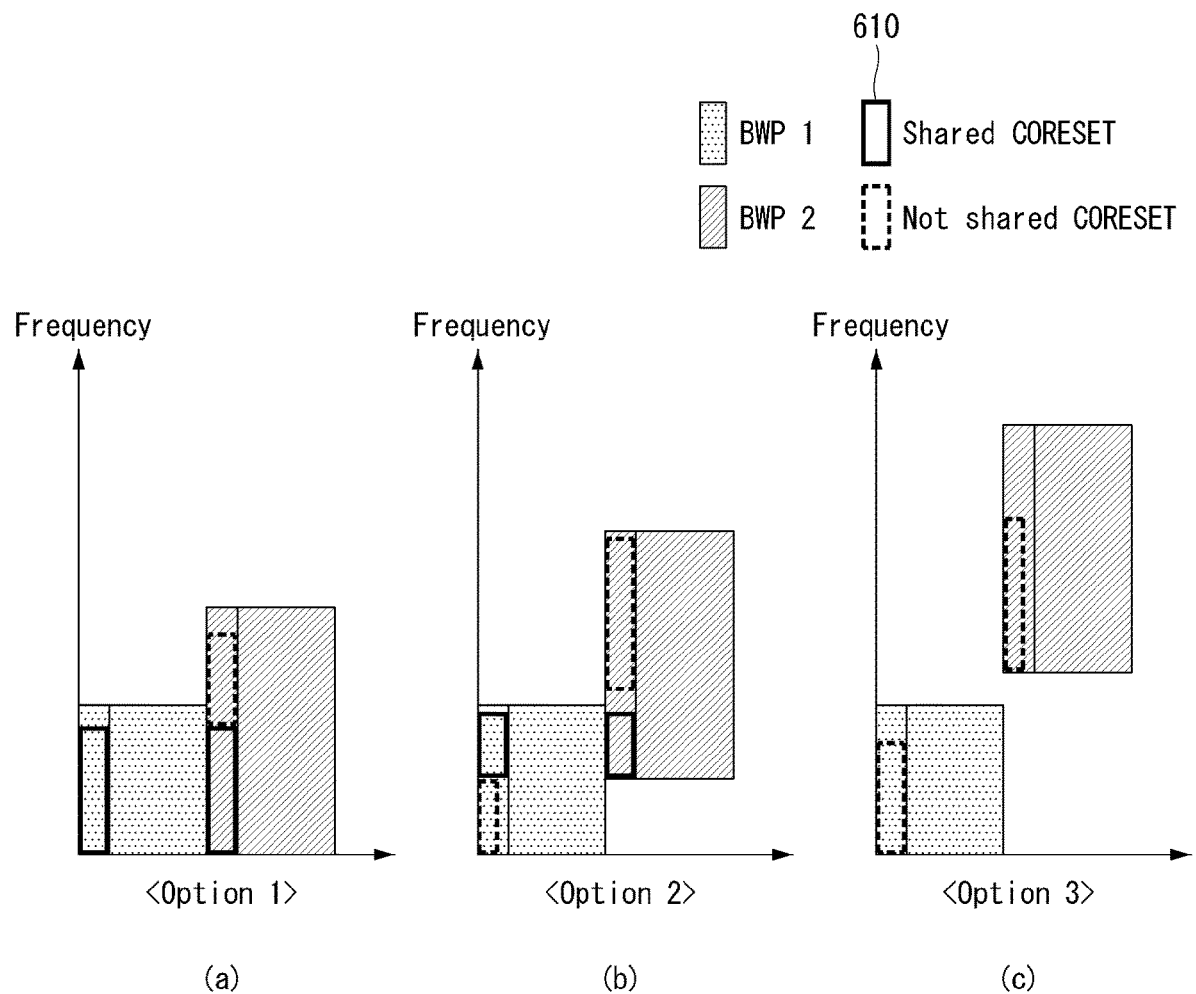
FIG. 6 is a diagram showing an example of a BWP state to which a method proposed in this specification may be applied.

FIG. 6 is a diagram showing an example of a BWP state to which a method proposed in this specification may be applied.

Specifically, FIG. 6a shows a case where BWPs fully overlap (in a frequency domain), FIG. 6b shows a case where BWPs partially overlap, and FIG. 6c shows a case where BWPs do not overlap.

Option 1 (FIG. 6a) shows a case where a currently activated BWP1 is fully included in a BWP2 to be activated next.

Option 2 (FIG. 6b) shows a case where part of a BWP1 overlaps a BWP2.

Option 3 (FIG. 6c) shows a case where a BWP1 is fully separated from a BWP2.

A control resource set (CORESET) configured in each of the BWPs shown in FIG. 6 is an example and may be configured in various ways depending on an NW configuration.

If a BWP1 is fully included in a BWP2 in the frequency domain and the two BWPs have the same numerology, a shared CORESET may be configured in the BWPs.

The shared CORESET is a part 610 indicative of the same range in the frequency domain, and may have the same or different indexing in different BWPs.

As in Option 1 of FIG. 6a, a CORESET having the same size as the BWP1 is configured in the BWP2. A network transmits an activation message to a UE using the UE-specific search space (USS) of the corresponding CORESET.

If both the BWP1 and the BWP2 use local PRB indexing and the lowest frequency is a start point in both the BWPs, a UE may perform a CORESET decoding process in the two BWPs in the same manner.

Furthermore, there may be a slight difference at subsequent timing of data decoding.

For example, if a BWP activation message transmitted by an NW has been missed, but the NW has received an ACK/NACK (A/N) signal for the corresponding message from a UE due to a system error, the NW transmits a BWP2, that is, a new BWP, from next timing.

However, the UE may continue to perform data processing in a BWP1 because the BWP activation message has been missed, but there is influence on the processing of information of a shared CORESET.

The UE may recognize that a BWP has switched by decoding scheduling information of the shared CORESET and may subsequently perform data processing in the BWP2.

However, in this case, some tuning time may be taken because the UE has to switch to a BW in which the data of the BWP2 can be processed.

In the case of Option 1 (FIG. 6a) and Option 2 (FIG. 6b), a UE may determine the shared part of a plurality of BWPs if the plurality of BWPs is configured in the UE.

A CORESET shared as the shared part may be configured.

A NW may configure a shared CORESET and a not-shared CORESET in the UE. When BWP adaptation DCI can be reached may be configured in the UE for each CORESET.

The BWP adaptation DCI may be expressed as BWP switching DCI and may mean DCI for indicating the switching of a BWP.

That is, the UE may identify whether BWP adaptation DCI can be reached based on a DCI size for each CORESET or may identify whether BWP adaptation DCI can be reached depending on the configuration of the configurations of a BWP that is covered for each CORESET.

A UE may not expect BWP adaptation in addition to a CORESET in which BWP adaptation DCI can be reduced. The UE assumes self-BWP scheduling in a corresponding BWP or CORSET.

In this case, self-BWP scheduling means the scheduling of a current BWP. Self-BWP scheduling DCI may mean DCI for scheduling a current BWP.

If one or more CORESETs are configured in a UE, BWP adaptation DCI is received in one of the CORESETs, and self-BWP scheduling is performed in another CORESET at a timing at which the corresponding BWP adaptation DCI is received, the following may be assumed.

That is, it is assumed that a physical downlink shared channel (PDSCH) or physical uplink shared channel (PUSCH) based on self-BWP scheduling occurs earlier than a PDSCH or PUSCH indicated in BWP adaptation DCI and a network provides notification of a gap for retuning/switching delay through DCI or the gap is semi-statically configured.

Furthermore, it is assumed that self-BWP scheduling and BWP adaptation do not occur simultaneously in one slot.

If a PDSCH or PUSCH for a self-BWP and a PDSCH or PUSCH for BWP adaptation overlap (or redundant), it is assumed that the BWP adaptation has priority.

Furthermore, a PDSCH or PUSCH for a self-BWP may be dropped, if necessary.

Alternatively, it may be assumed that a self-BWP or BWP adaptation occur simultaneously in all the CORESETs.

In this case, if each PUCCH resource is configured for each BWP with respect to PUCCH transmission, a network may guarantee that a PUCCH resource is indicated as a resource associated with a new BWP or data mapped to the same PUCCH resource is scheduled within the same BWP even in the case of self-BWP scheduling.

If not, a PUCCH corresponding to a new BWP or a PUCCH corresponding to a previous BWP may have priority based on its priority.

If the capability of a UE is supported, two PUCCHs may be transmitted at the same time.

Furthermore, if an old activated BWP and new activated BWP for one UE do not overlap in the frequency domain or do not use a shared CORESET, DCI of a common CORESET may be used.

In such a case, when the aforementioned situation occurs, there may be a case where a system does not perform a normal operation due to a difference in understanding between an NW and a UE.

That is, the NW may transmit a new BWP activation message, may receive an A/N message for the corresponding message from the UE due to a system error, and may transmit the A/N message in a new BWP.

In this case, the UE continues to perform decoding in an old BWP because the new BWP activate message is missed.

In such a case, in order to guarantee higher transmission/reception reliability, a processing process for phenomenon occurring when various phenomena occur may be defined as follows.

In this case, a BWP1 is a BWP now activated from the viewpoint of a UE, and a BWP2 is a BWP to be activated after a DCI command is received from an NW.

(Case 1)

Case 1 is a case where both an NW and a UE operate in the BWP1 and the UE has missed DCI (NW: BWP1—UE: BWP1, DCI missing).

That is, if the UE has not received the DCI although the NW has transmitted the DCI for activating a new BWP to the UE, both the NW and the UE perform processing in the BWP1.

In this case, if the NW does not receive a response from the UE for a specific time, it may retransmit the same message (new BWP activation DCI).

That is, Case 1 does not have any ambiguity.

(Case 2)

Case 2 is a case where the NW operates in the BWP1, the UE operates in the BWP2, and the NW has missed an ACK/NACK signal (NW: BWP1—UE: BWP2, A/N missing).

The NW transmits new BWP activation DCI to the UE. The UE detects the DCI and transmits decoding results to the NW.

Furthermore, the UE may activate the BWP2 from next timing.

However, if the NW has missed A/N transmitted by the UE, the NW continues to transmit a message in the BWP1.

In such a case, the NW may consider that BWP adaptation is successful only when A/N is received from the UE, and may transmit a corresponding confirm message to the UE.

Furthermore, the UE receives a new BWP only when it receives the confirm message.

Alternatively, the NW may determine whether the UE has received a new BWP activation message based on the A/N of the UE for data transmitted in an old BWP.

For example, if the NW has transmitted a new BWP activation message and common data in the subframe of an old BWP and has not received A/N for the new BWP activation message after a given time, but has received an ACK signal for the common data, the NW may determine that the A/N signal for the new BWP activate message transmitted by the UE has been missed.

Furthermore, the NW may consider the probability that the UE may have received the new BWP activation message to be high, and may perform duplicate TX in the old/new BWP at next timing in order to improve reliability of control information.

(Case 3)

Case 3 is a case where the NW operates in the BWP2, the UE operates in the BWP1, and the UE has missed a confirm message for an A/N signal transmitted with respect to new BWP activation DCI (NW: BWP2—UE: BWP1, DTX-to-A/N).

The NW transmits the new BWP activation DCI, and the UE detects the DCI and transmits decoding results to the NW.

If a confirm message is missed in a process for the NW to receive the corresponding A/N and to transmit the confirm message for the A/N signal to the UE or if the confirm message is not transmitted through NW scheduling, the UE may continue to be in the BWP1 in order to receive the confirm message.

Furthermore, the NW receives an (A/N) response from the UE and transmits data to the UE in the BWP2 at a next instant.

In this case, the UE may perform reception processing in two BWPs until it receives the confirm message depending on the capability of the UE. The NW may transmit data to the UE in a new BWP and transmit the confirm message to the UE through an old BWP at next timing.

(Case 4)

Case 4 is a case where the NW and the UE operate in the BWP2 and the NW has received A/N from the UE (NW: BWP2—UE: BWP2, A/N).

The NW transmits new BWP activate DCI to the UE. The UE detects the DCI and transmits decoding results to the NW.

Furthermore, the UE activates the BWP2 from next timing.

In this case, if the NW has accurately received A/N for the new BWP activation DCI, both the NW and the UE perform transmission and reception in the BWP2 at next timing.

As another embodiment, when a DL BWP is switched in time division duplex (TDD), an UL BWP may switch into a corresponding BWP.

The corresponding BWP may mean an UP BWP corresponding to the switched BWP.

That is, a DL BWP and an UL BWP are identically switched based on a BWP index (or BWP ID) indicated in DCI format 0_1 or DCI format 1_1.

In this case, DCI format 0_1 is DCI related to uplink scheduling, and DCI format 1_1 is DCI related to downlink scheduling.

In a TDD HARQ procedure, a given window size is determined and a BWP may be configured to not switch in the predetermined window.

The TDD may be expressed as an unpaired spectrum, and frequency division duplex (FDD) may be expressed as a paired spectrum.

In addition to the aforementioned method, as yet another embodiment, from the viewpoint of Option 2 (FIG. 6b), a BWP activation message may be retransmitted using both a shared CORESET and a not-shared CORESET.

For example, an NW may transmit new BWP activation DCI and transmit a signaling signal in both a shared CORESET and a not-shared CORESET from a next instant regardless of whether A/N for the DCI has been received.

If a UE receives the first BWP activation DCI, it may monitor the two CORESETs in a new BWP. If not, the UE may receive a BWP activation message by monitoring a shared CORESET configured in an old BWP.

RRM Handling According to BWP Switching

Next, a radio resource management (RRM) handling method according to BWP switching is described.

In the environment in which a BWP dynamically switches, if BWPs have a nested structure, an RRM BW may be configured as the smallest BWP.

When CSI measurement is performed in an environment having the same structure, the following some cases may be present depending on a BWP configuration.

First, accumulation is not performed on BWPs having different numerologies.

Second, accumulation is performed on a portion having the same physical resource blocks (PRBs) from among BWPs having the same numerology.

In an environment in which a BWP dynamically switches, an RRM BW may be configured for each BWP regardless of whether BWPs are configured in a nested structure.

Figure 7:
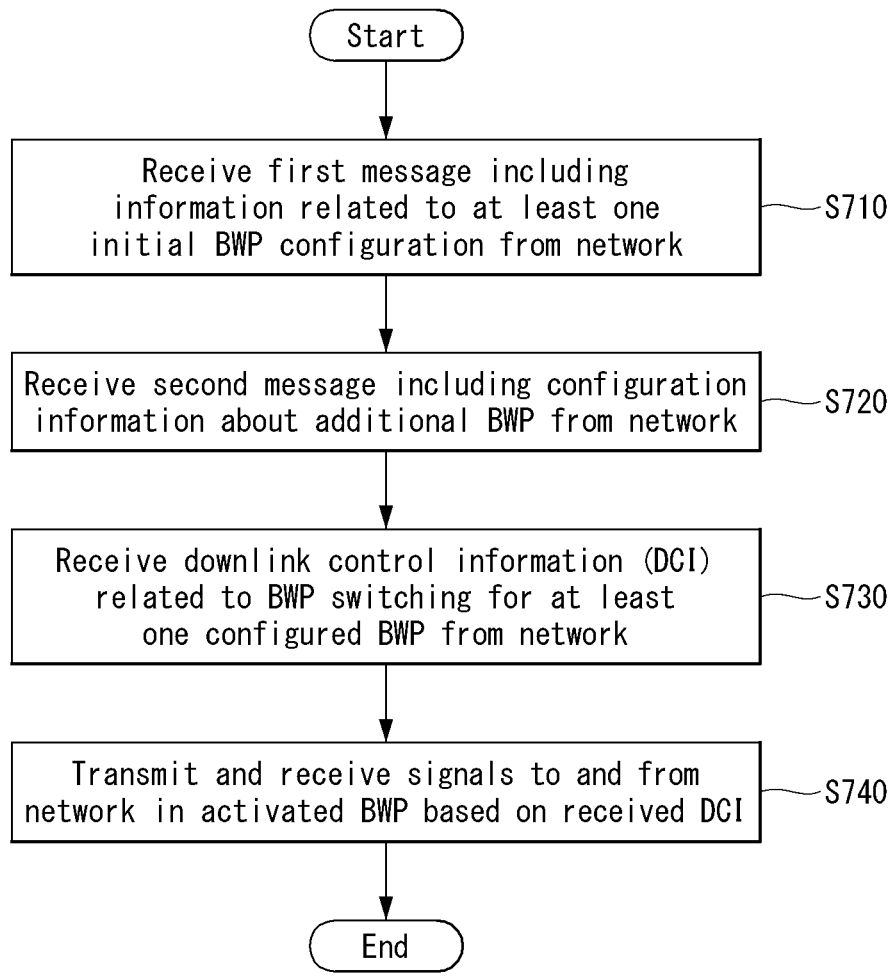
FIG. 7 is a flowchart showing an example of an operating method of a UE related to a BWP operation proposed in this specification.

FIG. 7 is a flowchart showing an example of an operating method of a UE related to a BWP operation proposed in this specification.

First, the UE receives a first message, including information related to at least one initial BWP configuration, from a network (S710).

The information related to the initial BWP configuration may include a BWP ID to identify an initial BWP. In this case, the BWP ID may be set to "0."

Alternatively, the ID of the initial BWP may be previously defined to "0." In this case, information related to an initial BWP configuration may not be included.

The first message may be a broadcast message or a physical broadcast channel (PBCH).

The PBCH may mean a physical channel in which system information, in particular, a master information block (MIB) is transmitted.

In this case, the physical channel is resource elements that carry information downloaded from a higher layer. The resource elements may include code, a frequency, and a time-slot.

Furthermore, the UE receives a second message, including configuration information for an additional BWP, from the network (S720).

In this case, the second message may be expressed as a RRC signaling or higher layer signaling.

That is, the second message may be RRC signaling downloaded from a higher layer in the RRC connected state.

The configuration information about the additional BWP may include a BWP identifier (ID) to identify the additional BWP.

Furthermore, the UE receives downlink control information (DCI) related to BWP switching for at least one configured BWP from the network (S730).

In this case, the BWP switching may mean the activation of a BWP or the deactivation of a BWP.

If a downlink (DL) BWP is switched by the DCI, a(n) uplink (UL) BWP may switch into a corresponding BWP.

In this case, the corresponding BWP may mean an UL BWP corresponding to the switched BWP.

For example, if the ID or index of a BWP switched by the DCI is "2", a switched DL BWP may mean a DL BWP having a BWP ID=2, and a switched UL BWP may mean an UL BWP having a BWP ID=2.

Furthermore, the switching into the corresponding BWP for the UL BWP may be applied to only a TDD system.

Furthermore, the UE transceives (or transmits and receives) signal(s) with (to/from) the network in an activated BWP based on the received DCI (S740).

Additionally, the DCI related to the BWP switching may be received in a shared control resource set (CORESET). The shared CORESET may be configured in a shared part between a configured first BWP and a configured second BWP.

The first BWP and the second BWP may have the same numerology.

Additionally, the UE may transmit an acknowledge (ACK) or a non-acknowledge (NACK) for the DCI to the network.

General Apparatus to which the Present Invention May be Applied

Figure 8:
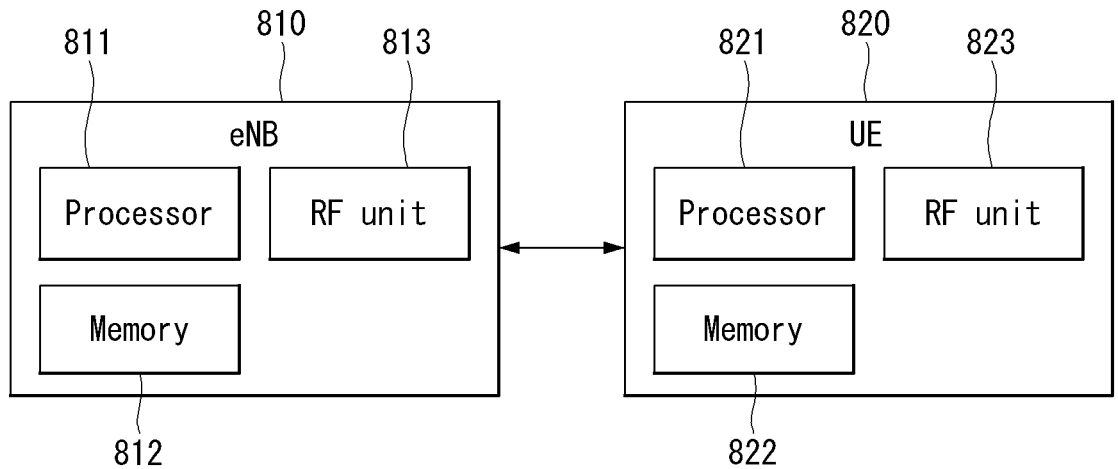
FIG. 8 illustrates a block diagram of a wireless communication device to which a method proposed in this specification may be applied.

FIG. 8 illustrates a block diagram of a wireless communication device to which a method proposed in this specification may be applied.

Referring to FIG. 8, the wireless communication system includes an eNB 810 and multiple UEs 820 disposed within the region of the eNB 810.

Each of the eNB and the UE may be expressed as a wireless device.

The eNB 810 includes a processor 811, a memory 812 and a radio frequency (RF) module 813. The processor 811 implements the functions, processes and/or methods proposed in FIGS. 1 to 7. The layers of a radio interface protocol may be implemented by the processor. The memory 812 is connected to the processor and stores a variety of types of information for driving the processor. The RF module 813 is connected to the processor, and transmits and/or receives radio signals.

The UE 820 includes a processor 821, a memory 822 and an RF module 823.

The processor 821 implements the functions, processes and/or methods proposed in FIGS. 1 to 7. The layers of a radio interface protocol may be implemented by the processor. The memory 822 is connected to the processor, and stores a variety of types of information for driving the processor. The RF module 823 is connected to the processor, and transmits and/or receives radio signals.

The memory 812, 822 may be positioned inside or outside the processor 811, 821 and may be connected to the processor 811, 821 by various well-known means.

Furthermore, the eNB 810 and/or the UE 820 may have a single antenna or multiple antennas.

Figure 9:
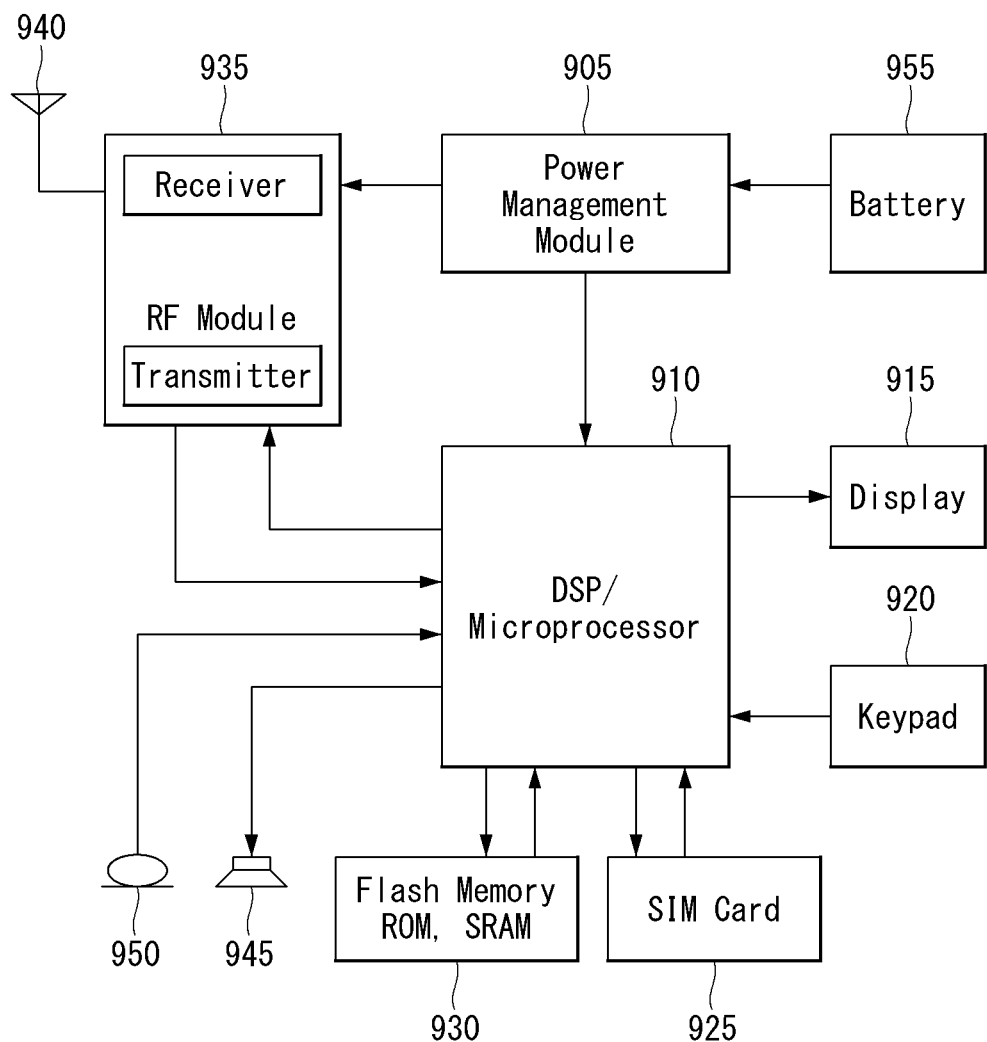
FIG. 9 illustrates a block diagram of a communication device according to an embodiment of the present invention.

FIG. 9 illustrates a block diagram of a communication device according to an embodiment of the present invention.

In particular, FIG. 9 is a diagram showing the UE of FIG. 8 more specifically.

Referring to FIG. 9, the UE may include a processor (or digital signal processor (DSP)) 910, an RF module (or RF unit) 935, a power management module 905, an antenna 940, a battery 955, a display 915, a keypad 920, a memory 930, a subscriber identification module (SIM) card 925 (this element is optional), a speaker 945, and a microphone 950. The UE may further include a single antenna or multiple antennas.

The processor 910 implements the functions, processes and/or methods proposed in FIGS. 1 to 7. The layers of a radio interface protocol may be implemented by the processor.

The memory 930 is connected to the processor, and stores information related to the operation of the processor. The memory may be positioned inside or outside the processor and may be connected to the processor by various well-known means.

A user inputs command information, such as a telephone number, by pressing (or touching) a button of the keypad 920 or through voice activation using the microphone 950, for example. The processor receives such command information and performs processing so that a proper function, such as making a phone call to the telephone number, is performed. Operational data may be extracted from the SIM card 925 or the memory. Furthermore, the processor may recognize and display command information or driving information on the display 915, for convenience sake.

The RF module 935 is connected to the processor and transmits and/or receives RF signals. The processor delivers command information to the RF module so that the RF module transmits a radio signal that forms voice communication data, for example, in order to initiate communication. The RF module includes a receiver and a transmitter in order to receive and transmit radio signals. The antenna 940 functions to transmit and receive radio signals. When a radio signal is received, the RF module delivers the radio signal so that it is processed by the processor, and may convert the signal into a baseband. The processed signal may be converted into audible or readable information output through the speaker 945.

Figure 10:
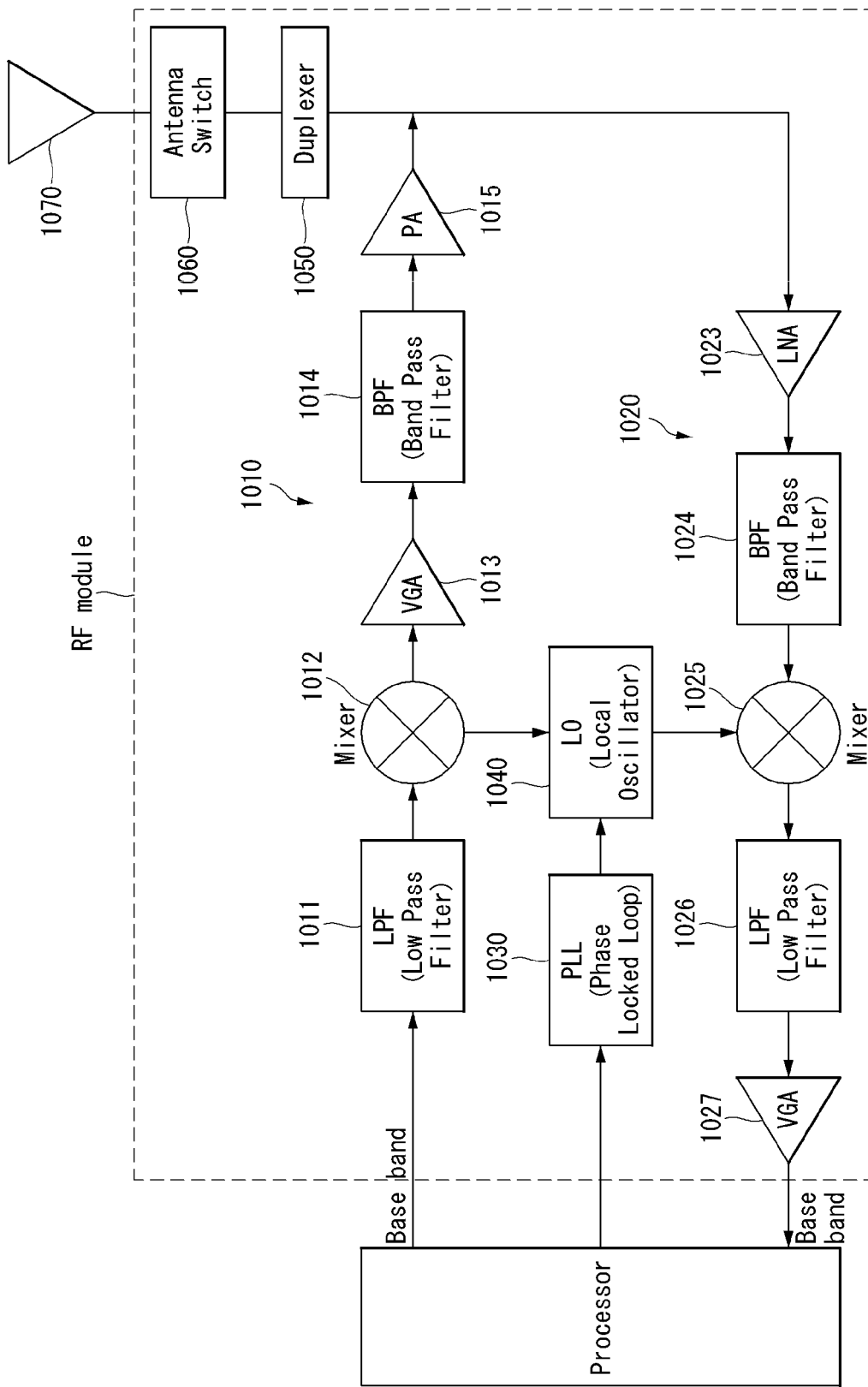
FIG. 10 is a diagram showing an example of the RF module of a wireless communication device to which a method proposed in this specification may be applied.

FIG. 10 is a diagram showing an example of the RF module of a wireless communication device to which a method proposed in this specification may be applied.

Specifically, FIG. 10 shows an example of an RF module that may be implemented in a frequency division duplex (FDD) system.

First, in a transmission path, the processor described in FIGS. 8 and 9 processes data to be transmitted and provides an analog output signal to a transmitter 1010.

In the transmitter 1010, the analog output signal is filtered by a low pass filter (LPF) 1011 in order to remove images caused by digital-to-analog conversion (ADC). The signal is up-converted from a baseband to an RF by a mixer 1012 and is amplified by a variable gain amplifier (VGA) 1013. The amplified signal is filtered by a filter 1014, additionally amplified by a power amplifier (PA) 1015, routed by a duplexer(s) 1050/antenna switch(es) 1060, and transmitted through an antenna 1070.

Furthermore, in a reception path, the antenna 1070 receives signals from the outside and provides the received signals. The signals are routed by the antenna switch(es) 1060/duplexers 1050 and provided to a receiver 1020.

In the receiver 1020, the received signals are amplified by a low noise amplifier (LNA) 1023, filtered by a band pass filter 1024, and down-converted from the RF to the baseband by a mixer 1025.

The down-converted signal is filtered by a low pass filter (LPF) 1026 and amplified by a VGA 1027, thereby obtaining the analog input signal. The analog input signal is provided to the processor described in FIGS. 8 and 9.

Furthermore, a local oscillator (LO) 1040 generates transmission and reception LO signals and provides them to the mixer 1012 and the mixer 1025, respectively.

Furthermore, a phase locked loop (PLL) 1030 receives control information from the processor in order to generate transmission and reception LO signals in proper frequencies, and provides control signals to the local oscillator 1040.

Furthermore, the circuits shown in FIG. 10 may be arrayed differently from the configuration shown in FIG. 10.

Figure 11:
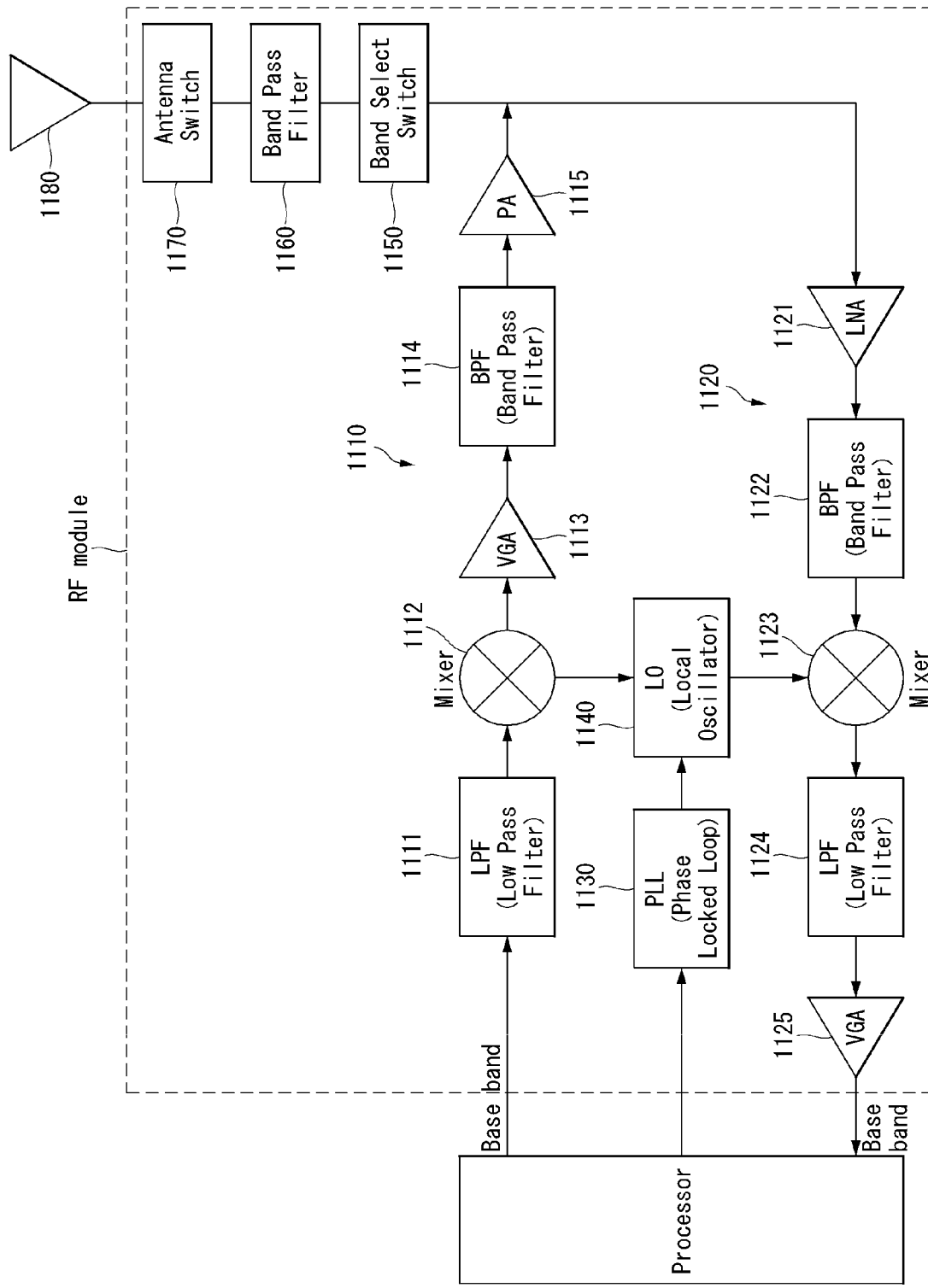
FIG. 11 is a diagram showing another example of the RF module of a wireless communication device to which a method proposed in this specification may be applied.

FIG. 11 is a diagram showing another example of the RF module of a wireless communication device to which a method proposed in this specification may be applied.

Specifically, FIG. 11 shows an example of an RF module that may be implemented in a time division duplex (TDD) system.

The transmitter 1110 and receiver 1120 of the RF module in the TDD system have the same structure as the transmitter and receiver of the RF module in the FDD system.

Hereinafter, only a different structure between the RF module of the TDD system and the RF module of the FDD system is described. Reference is made to the description of FIG. 10 for the same structure.

A signal amplified by the power amplifier (PA) 1115 of the transmitter is routed through a band select switch 1150, a band pass filter (BPF) 1160 and an antenna switch(es) 1170 and is transmitted through an antenna 1180.

Furthermore, in a reception path, the antenna 1180 receives signals from the outside and provides the received signals. The signals are routed through the antenna switch (es) 1170, the band pass filter 1160 and the band select switch 1150 and are provided to the receiver 1120.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method of performing a BWP operation in a wireless communication system according to the present invention has been described based on an example in which it is applied to the 3GPP LTE/LTE-A system and the 5G system (new RAT system), but may be applied to various wireless communication systems in addition to the 3GPP LTE/LTE-A system and the 5G system.

What is claimed is:

1. A method of transmitting, by a user equipment, a signal in a time division duplex (TDD) wireless communication system, the method comprising:
receiving, from a base station, configuration information comprising (i) information for a first bandwidth part (BWP) and (ii) information for downlink (DL) BWPs;
receiving, from the base station, a signal on the first BWP based on an initial access procedure;
receiving, from the base station, downlink control information (DCI) on the first BWP, where the DCI is related to switching a DL BWP to a second BWP among the DL BWPs;
based on the DCI related to switching the DL BWP, switching an uplink (UL) BWP to a third BWP that corresponds to the second BWP; and
transmitting, to the base station, a signal on the third BWP.

2. The method of claim 1, wherein switching the UL BWP to the third BWP comprises activating a BWP or deactivating a BWP.

3. The method of claim 1, wherein the information for the DL BWPs comprises BWP identifiers (IDs) to identify the DL BWPs.

4. The method of claim 1, wherein:
the DCI related to switching the DL BWP is received in a shared control resource set (CORESET), and
the shared CORESET is configured in a part that is commonly shared between a plurality of configured BWPs.

5. The method of claim 4, wherein each of the plurality of configured BWPs have an identical numerology.

6. The method of claim 1, further comprising:
transmitting, to the base station, an acknowledgement (ACK) or a negative acknowledgement (NACK) for the DCI.

7. The method of claim 1, wherein switching the UL BWP to the third BWP that corresponds to the second BWP comprises:
switching the UL BWP to the third BWP having a BWP index that is identical to a BWP index of the second BWP to which the DL BWP was switched.

8. A processing apparatus configured to control a user equipment to transmit a signal in a time division duplex (TDD) wireless communication system, the processing apparatus comprising:
at least one processor; and
at least one computer memory operably connectable to the at least one processor and storing instructions that, based on being executed by the at least one processor, perform operations comprising:
receiving, from a base station, configuration information comprising (i) information for a first bandwidth part (BWP) and (ii) information for downlink (DL) BWPs;
receiving, from the base station, a signal on the first BWP based on an initial access procedure;
receiving, from the base station, downlink control information (DCI) on the first BWP, where the DCI is related to switching a DL BWP to a second BWP among the DL BWPs;
based on the DCI related to switching the DL BWP, switching an uplink (UL) BWP to a third BWP that corresponds to the second BWP; and
transmitting, to the base station, a signal on the third BWP.

9. The processing apparatus of claim 8, wherein switching the UL BWP to the third BWP comprises activating a BWP or deactivating a BWP.

10. The processing apparatus of claim 8, wherein the information for the DL BWPs comprises BWP identifiers (IDs) to identify the DL BWPs.

11. The processing apparatus of claim 8, wherein:
the DCI related to switching the DL BWP is received in a shared control resource set (CORESET), and
the shared CORESET is configured in a part that is commonly shared between a plurality of configured BWPs.

12. The processing apparatus of claim 11, wherein each of the plurality of configured BWPs have an identical numerology.

13. The processing apparatus of claim 8, the operations further comprise:
transmitting, to the base station, an acknowledgement (ACK) or a negative acknowledgement (NACK) for the DCI.

14. The processing apparatus of claim 8, wherein switching the UL BWP to the third BWP that corresponds to the second BWP comprises:
switching the UL BWP to the third BWP having a BWP index that is identical to a BWP index of the second BWP to which the DL BWP was switched.

15. A non-transitory computer readable storage medium storing at least one instruction, that, based on being executed by at least one processor, perform operations comprising:
receiving, from a base station, configuration information comprising (i) information for a first bandwidth part (BWP) and (ii) information for downlink (DL) BWPs;
receiving, from the base station, a signal on the first BWP based on an initial access procedure;
receiving, from the base station, downlink control information (DCI) on the first BWP, where the DCI is related to switching a DL BWP to a second BWP among the DL BWPs;
based on the DCI related to switching the DL BWP, switching an uplink (UL) BWP to a third BWP that corresponds to the second BWP; and
transmitting, to the base station, a signal on the third BWP.

* * * * *